(12) United States Patent
Chung et al.

(10) Patent No.: US 7,627,230 B2
(45) Date of Patent: Dec. 1, 2009

(54) INFORMATION STORAGE MEDIUM CONTAINING ENHANCED AV (ENAV) BUFFER CONFIGURATION INFORMATION, REPRODUCING METHOD THEREOF AND METHOD FOR MANAGING THE BUFFER

(75) Inventors: Hyun-kwon Chung, Seoul (KR); Sung-wook Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 953 days.

(21) Appl. No.: 10/812,010

(22) Filed: Mar. 30, 2004

(65) Prior Publication Data

US 2004/0190876 A1    Sep. 30, 2004

(30) Foreign Application Priority Data

| Mar. 31, 2003 | (KR) | ...................... 10-2003-0019965 |
| Sep. 3, 2003 | (KR) | ...................... 10-2003-0061310 |
| Sep. 3, 2003 | (KR) | ...................... 10-2003-0061565 |
| Sep. 3, 2003 | (KR) | ...................... 10-2003-0061566 |

(51) Int. Cl.
*H04N 7/00* (2006.01)

(52) U.S. Cl. ........................... 386/95; 386/124; 386/125

(58) Field of Classification Search ................... 386/95, 386/124, 125
See application file for complete search history.

(56) References Cited

U.S. PATENT DOCUMENTS

| 5,036,505 | A | | 7/1991 | Gleim |
| 5,351,226 | A | | 9/1994 | Mizumoto et al. |
| 5,546,368 | A | | 8/1996 | Lee et al. |
| 5,721,591 | A | | 2/1998 | Yonemitsu et al. |
| 5,929,857 | A | | 7/1999 | Dinallo et al. |
| 6,044,439 | A | * | 3/2000 | Ballard et al. ................ 711/137 |
| 6,047,292 | A | * | 4/2000 | Kelly et al. .................. 715/716 |
| 6,507,696 | B1 | | 1/2003 | Chung et al. |
| 6,564,255 | B1 | | 5/2003 | Mobini et al. |
| 6,580,870 | B1 | * | 6/2003 | Kanazawa et al. ............ 386/95 |
| 2001/0026509 | A1 | | 10/2001 | Kimikawa |
| 2003/0012558 | A1 | | 1/2003 | Kim et al. |
| 2003/0049017 | A1 | * | 3/2003 | Chung et al. .................. 386/95 |
| 2003/0081943 | A1 | | 5/2003 | Kim et al. |

(Continued)

FOREIGN PATENT DOCUMENTS

EP    0 653 753    5/1995

(Continued)

OTHER PUBLICATIONS

U.S. Appl. No. 10/812,089, filed Mar. 30, 2004, Hyun-kwan Chung et al.

(Continued)

*Primary Examiner*—Thai Tran
*Assistant Examiner*—Girumsew Wendmagegn
(74) *Attorney, Agent, or Firm*—Stein McEwen, LLP

(57) ABSTRACT

A recording and/or reproducing apparatus for use with an information storage medium including ENAV buffer configuration information includes: an ENAV buffer in which an ENAV file is loaded; and an ENAV engine which interprets and reproduces the ENAV file, wherein the ENAV engine allocates at least a portion of the ENAV buffer as an updateable markup area on the basis of ENAV buffer configuration information, reads the ENAV file, and loads the ENAV file in the ENAV buffer.

25 Claims, 16 Drawing Sheets

U.S. PATENT DOCUMENTS

2003/0084460 A1    5/2003    Chung et al.
2003/0161615 A1*   8/2003    Tsumagari et al. ............ 386/95

FOREIGN PATENT DOCUMENTS

| EP | 0 814 465 | | 12/1997 |
|---|---|---|---|
| EP | 1267352 | * | 12/2002 |
| KR | 2003-35272 | | 5/2003 |
| KR | 2003-94602 | | 12/2003 |
| TW | 304262 | | 5/1997 |
| TW | 432372 | | 5/2001 |
| WO | WO 2004/088662 | | 10/2004 |

OTHER PUBLICATIONS

U.S. Appl. No. 10/811,976, filed Mar. 30, 2004, Hyun-Kwan Chung et al.

U.S. Appl. No. 10/647,445, filed Aug. 26, 2003, Jung et al.

International Search Report mailed on Jul. 13, 2004, in International Application No. PCT/KR2004/000733.

Written Opinion of the International Searching Authority mailed on Jul. 13, 2004, in International Application No. PCT/KR2004/000733.

Korean Office Action issued on Jun. 24, 2005, in Korean Patent Application No. 2003-61310 (in Korean with complete English translation).

Taiwanese Office Action issued on Mar. 3, 2008, in Taiwanese Application No. 093108806 (in Chinese with complete English translation).

U.S. Appl. No. 10/647,445, filed Aug. 26, 2003, Jung et al., Samsung Electronics Co., Ltd.

U.S. Appl. No. 10/165,427, filed Jun. 10, 2002, Kim et al., Samsung Electronics Co., Ltd.

U.S. Appl. No. 10/170,419, filed Jun. 14, 2003, Chung et al., Samsung Electronics Co., Ltd.

U.S. Appl. No. 10/277,094, filed Oct. 22, 2002, Chung et al., Samsung Electronics Co., Ltd.

* cited by examiner

FIG. 7
<STARTUP.MLS>

```
<startup>
    . . .
                                                                    C
    <loadinginfo href="file://dvdrom:/DVD_ENAV/LoadingInformation.ldi">
    </loadinginfo>

. . .
</startup>
```

FIG. 8
<LOADINGINFORMATION.LDI>

```
<?xml version="1.0" ?>
<!DOCTYPE manifest PUBLIC "-//DVD//DTD DVD-MLS 1.0//EN"
"dtd/dvdmls-1-0-content.dtd">

<manifest>
                                    D
    <memory name="um" size="6KB" />

<entityset xml:base="file://dvd_ENVA/" type="preload">
    <initial href="CHATROOM.HTM"/>
    <entity href="CHATTITLE.HTM"/>
    <entity href="C1.PNG"/>
    <entity href="C2.PNG"/>
    <entity href="http://www.company.com/INPUT.HTM"/>
    <entity href="http://www.company.com/P1.GIF"/>
    <entity buffer="um" href="http://www.company.com/DIALOG.HTM"/>
    <entity buffer="um" href="http://www.company.com/DIALOG.CSS"/>
    </entityset>
</manifest>
```

FIG. 10

```
<html>
<head>
<title>Chat Room</title>
</head>
<frameset border="0" framespacing="0" rows="50,*,70" frameborder="no">
    <frame name=menuoben marginwidth=1 marginheight=1 src="chattitle.htm" noresize="1" scrolling="no" />
    <frame name=inhalt marginwidth=1 marginheight=1 src="http://www.company.com/dialog.htm" frameborder="no" noresize="1" scrolling="no" />
    <frame src="input.htm" />
<noframes>
<p>Browser has to support to frameset.</p>
</noframes>
</frameset>
</html>
```

FIG. 11

```
<html>
<head>
<link rel="stylesheet" type="text/css" href="dialog.css" />
<script type="text/ecmascript">
function update()
{
    location.href = "dialog.htm"
}
</script>
</head>
<body onload="settimeout('update()',1000);">
<p><span class="thorton">thorton:</span><span class="thorton_text">hi</span></p>
<p><span class="anju">anju:</span><span class="anju_text">hi~</span></p>
<p><span class="thorton">thorton:</span><span class="thorton_text">
i'm getting 2 different replies, so.... are the connectors on laptop
hard drives standardised,
or do they vary from one make to another?</span></p>
<p><span class="anju">anju:</span><span class="anju_text">connectors are standardised but every laptop makes
it different in shape except the pins</span></p>
<p><span class="cosgrove">cosgrove:</span><span class="cosgrove_text">the hard drives are the same. the
difference is what's called the caddy. if you are upgrading or replacing the drive,
just take the old drive out of the caddy and put the new one in it.</span></p>
</body>
</html>
```

FIG. 12

```
<html>
<head>
<title>input</title>
<body style="background-image: url(p1.gif)" >
<table width="515">
<tr>
<td valign="top" width="135"><img style = "height: 60px; width: 135px"
src="file://c1.png" border="0">
</td>
<td style="align:right" style="width: 310px">
<form method="post" action="="/cgi-bin/input.cgi">
<p style="align: left"><br />message:<input maxlength="30" name="msgtext" size="30">
<input type="submit" value="send" /> </form>
</td>
</tr>
</table>
</body>
</html>
```

FIG. 14

① GET /dialog.htm HTTP/1.0
Date: Fri, 20 Sep 1996 08:20:58 GMT
Connection: Keep-Alive
User-Agent: ENAV 1.0(manufacturer)
Referer: file://dvd_ENAV/Loadinginformation.ldi/
Accept: text/xml+chat ② HTTP/1.0 200
Date: Fri, 20 Sep 1996 08:20:58 GMT
Server: ENAV 1.0(NCSA/1.5.2)
Last-modified: Fri, 20 Sep 1996 08:17:58 GMT
Content-type: text/xml+chat
Content-length: 2482

FIG. 15

① GET /dialog.htm HTTP/1.0
Date: Fri, 20 Sep 1996 08:20:58 GMT
Connection: Keep-Alive
User-Agent: ENAV 1.0(manufacturer)
Referer: file://dvd_ENAV/chatroom.htm
Accept: text/xml+chat ② HTTP/1.0 200
Date: Fri, 20 Sep 1996 08:20:58 GMT
Server: ENAV 1.0(NCSA/1.5.2)
Last-modified: Fri, 20 Sep 1996 08:20:58 GMT
Content-type: text/xml+chat
Content-length: 2482

FIG. 16

| LOCATION OF FILE | MEMORY SIZE TO BE RESERVED | FILE TYPE (UPDATE) |
|---|---|---|
| http://www.company.com/DIALOG.HTM | 5KBytes | text/xml+chat (yes) |
| http://www.company.com/DIALOG.CSS | 1KBytes | text/css (yes) |
| http://www.company.com/INPUT.HTM | | image/xml+htm |
| http://www.company.com/P1.GIF | | image/gif |
| file://DVD_INT/CHATROOM.HTM | | image/xml+html |
| file://DVD_INT/CHATTITLE.HTM | | image/xml+html |
| file://DVD_INT/C1.PNG | | image/png |
| file://DVD_INT/C2.PNG | | image/png |

INFORMATION STORAGE MEDIUM CONTAINING ENHANCED AV (ENAV) BUFFER CONFIGURATION INFORMATION, REPRODUCING METHOD THEREOF AND METHOD FOR MANAGING THE BUFFER

CROSS-REFERENCE TO RELATED APPLICATIONS

This application claims the benefit of Korean Patent Application No. 2003-19965, filed on Mar. 31, 2003 in the Korean Intellectual Property Office, Korean Patent Application No. 2003-61566, filed on Sep. 3, 2003 in the Korean Intellectual Property Office, Korean Patent Application No. 2003-61565, filed on Sep. 3, 2003 in the Korean Intellectual Property Office, and Korean Patent Application No. 2003-61310, filed on Sep. 3, 2003 in the Korean Intellectual Property Office, the disclosures of which are incorporated herein in their entireties by reference.

BACKGROUND OF THE INVENTION

1. Field of the Invention

The present invention relates to an apparatus for reproducing contents recorded on an information storage medium in an interactive mode, and more particularly, to a recording and/or reproducing apparatus capable of reproducing Audio Video (AV) data in an interactive mode, a method of managing an Enhanced AV (ENAV) buffer installed in the recording and/or reproducing apparatus, and an information storage medium having information used to manage the ENAV buffer in the interactive mode.

2. Description of the Related Art

Digital Versatile Discs (DVDs) which support an interactive mode to reproduce Audio Video (AV) data in the interactive mode in a Personal Computer (PC) environment have been on the market and will be referred to as interactive DVDs. The interactive DVD contains markup documents as interactive data for supporting interactive functions as well as the AV data according to a conventional DVD-Video standard. The AV data recorded on the interactive DVD can be displayed in two modes. One mode is a video mode in which an AV picture is displayed in the same form as a general DVD-Video. The other mode is an interactive mode in which both an AV picture and a markup document are displayed in a manner that the AV picture is embedded in the markup document. For example, where the AV data is a movie title, a corresponding movie is shown in a display on an AV picture area and various additional information (such as a scenario of the movie, pictures of casts, etc.) is displayed on the remaining area of the display except for the AV picture area.

The additional information can be displayed in synchronization with the movie title (AV data). For example, when a specific actor appears, a markup document containing the actor's personal history information is required and displayed. Furthermore, the markup document displayed in the interactive mode allows interaction with a user. For example, if the user presses a button made on the markup document, there is displayed the history information of an actor appearing on the AV picture being presently reproduced.

However, in consumer devices (for example, a home DVD player) capable of reproducing the interactive DVD (i.e., capable of supporting an interactive mode), a problem exists in buffer management for supporting the interactive mode. FIGS. 1A and 1B are reference views for easily explaining a problem in a conventional technique.

Referring to FIG. 1A, a conventional Personal Computer (PC) 5 includes a main buffer 55 with a capacity of hundreds of megabytes or more (for example, 256 MB). The PC 5 further includes a hard disk 56 as an auxiliary buffer with a capacity dozens of gigabytes or more (for example, 32 GB). Accordingly, when the PC 5 tries to receive data from a server 9 over the Internet, there scarcely occur cases where the data is not received due to space limitation of the buffer 55 or 56 for storing the data.

However, as shown in FIG. 1B, a home DVD player 2 which is connected to and used with a television 1 has a lower buffer capacity as compared to the PC 5. The buffer capacity is generally only a buffer 25 with a capacity of dozens of megabytes (for example, 32 MB). Accordingly, when the home DVD player 2 tries to access the server 9 over the Internet and receive desired contents, the home DVD player 2 cannot accommodate the contents if the server 9 provides the contents using a method in which contents are stored in a buffer without limitation as in the PC 5.

SUMMARY OF THE INVENTION

An aspect of the present invention provides a method for managing a buffer, a recording and/or reproducing apparatus, and an information storage medium thereof, capable of smoothly receiving and reproducing desired contents using a lower capacity buffer without buffer shortage when receiving the desired contents from a server over the Internet, in a recording and/or reproducing apparatus such as a consumer device capable of supporting an interactive mode.

According to an aspect of the present invention, there is provided a method of managing a buffer in an interactive device, the method comprising: allocating at least a portion of an Enhanced AV (ENAV) buffer to be an updateable markup area for an ENAV file on the basis of ENAV buffer configuration information; and loading a predetermined ENAV file using the allocated updateable markup area.

According to an aspect of the invention, the allocating the ENAV buffer comprises: allocating the updateable markup area according to information of memory sizes included in the ENAV buffer configuration information, or allocating the updateable markup area according to information of memory names and sizes included in the ENAV buffer configuration information.

According to an aspect of the invention, the allocating the ENAV buffer comprises reading ENAV buffer configuration information recorded in a loading information file, and the loading the predetermined ENAV file comprises loading a corresponding ENAV file with reference to information of names and locations of the ENAV file recorded in the loading information file.

According to an aspect of the invention, the allocating the ENAV buffer comprises reading ENAV buffer configuration information recorded in a loading information file using memory elements, reading as the ENAV buffer configuration information names and sizes of memories recorded in the loading information file using attributes of the memory elements, or reading a predetermined loading information file with reference to a startup file included in a directory provided for the ENAV file; and reading the ENAV buffer configuration information recorded in the loading information file.

According to an aspect of the invention, the loading the predetermined ENAV file comprises loading the ENAV file stored in a disk in the updateable markup area with reference to the name and location information of the ENAV file recorded in the loading information file, or requesting the ENAV file based on the name and location information of the ENAV file recorded in the loading information file to a server and loading an ENAV file provided from the server in the updateable markup area.

According to another aspect of the present invention, a buffer management method for providing a chat service in an interactive device includes allocating at least a portion of an ENAV buffer to be an updateable markup area for an ENAV file on the basis of ENAV buffer configuration information; and loading the ENAV file for providing the chat service in the allocated updateable markup area.

Meanwhile, according to another aspect of the present invention, there is provided an information storage medium comprising: at least an ENAV file containing ENAV data, and ENAV buffer configuration information provided for allocating as an updateable markup area at least a portion of the ENAV buffer in which the ENAV file is loaded.

According to an aspect of the invention, the ENAV buffer configuration information is recorded in a loading information file including names and locations information of predetermined ENAV files to be read in advance, is recorded in the loading information file using a memory element, is recorded as memory names and sizes in the loading information file using an attribute of the memory element, or is recorded in a loading information file linked to a startup file included in a directory provided for the ENAV files.

According to another aspect of the present invention, a recording and/or reproducing apparatus, which reproduces AV data in an interactive mode, comprises: an ENAV buffer in which an ENAV file is loaded; and an ENAV engine which interprets and reproduces the ENAV file, wherein the ENAV engine allocates at least a portion of the ENAV buffer to be an updateable markup area on the basis of ENAV buffer configuration information, reads the ENAV file, and loads the ENAV file in the ENAV buffer.

According to an aspect of the invention, the ENAV engine reads the ENAV buffer configuration information recorded in a loading information file including names and locations information of predetermined ENAV files to be read in advance, reads the ENAV buffer configuration information recorded in the loading information file using a memory element, reads as the ENAV buffer configuration information memory names and sizes recorded in the loading information file using an attribute of the memory element, or reads the ENAV buffer configuration information recorded in a loading information file linked to a startup file included in a directory provided for the ENAV files.

According to another aspect of the present invention, a recording and/or a reproducing apparatus, which reproduces AV data in an interactive mode, comprises: an ENAV buffer in which an ENAV buffer for providing a predetermined Internet service is loaded; and an ENAV engine which interprets and reproduces the ENAV file, wherein the ENAV engine allocates at least a portion of the ENAV buffer to be an updateable markup area on the basis of ENAV buffer configuration information, reads the ENAV file, and loads the ENAV file in the ENAV buffer, thereby providing the predetermined Internet service.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the present invention will become more apparent by describing in detail exemplary embodiments thereof with reference to the accompanying drawings in which:

FIG. 7 shows an example of a startup file STARTUP.MLS according to an embodiment of the present invention;

FIG. 8 shows an example of a loading information file LOADINGINFORMATION.LDI according to an embodiment of the present invention;

FIGS. 10 through 12 show examples of markup documents for a chatwindow;

FIGS. 14 and 15 show examples for executing operations (1) and (2), respectively, in the communication process of FIG. 13;

FIG. 16 is a view showing configuration information of an updateable markup area decided based on Enhanced AV (ENAV) buffer configuration information, according to an embodiment of the present invention;

DETAILED DESCRIPTION OF THE EMBODIMENTS

Figure 1A:
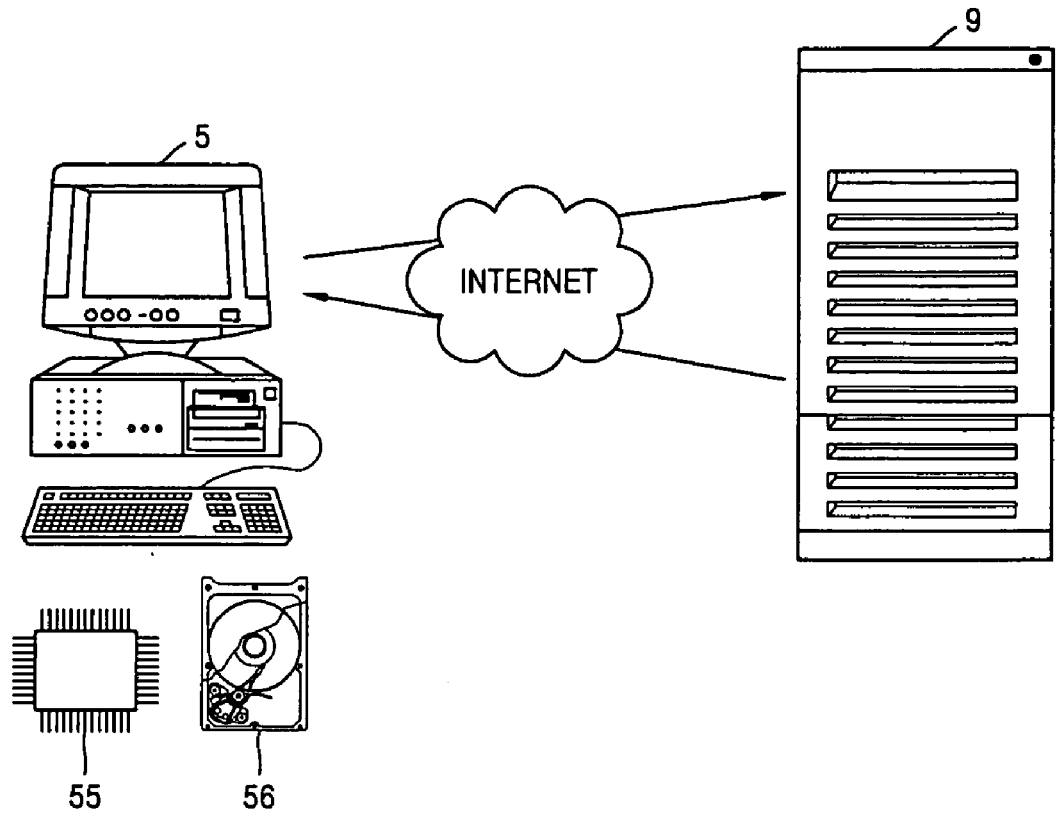
FIGS. 1A and 1B are reference views for easily explaining a problem in a conventional technique.
Figure 1B:
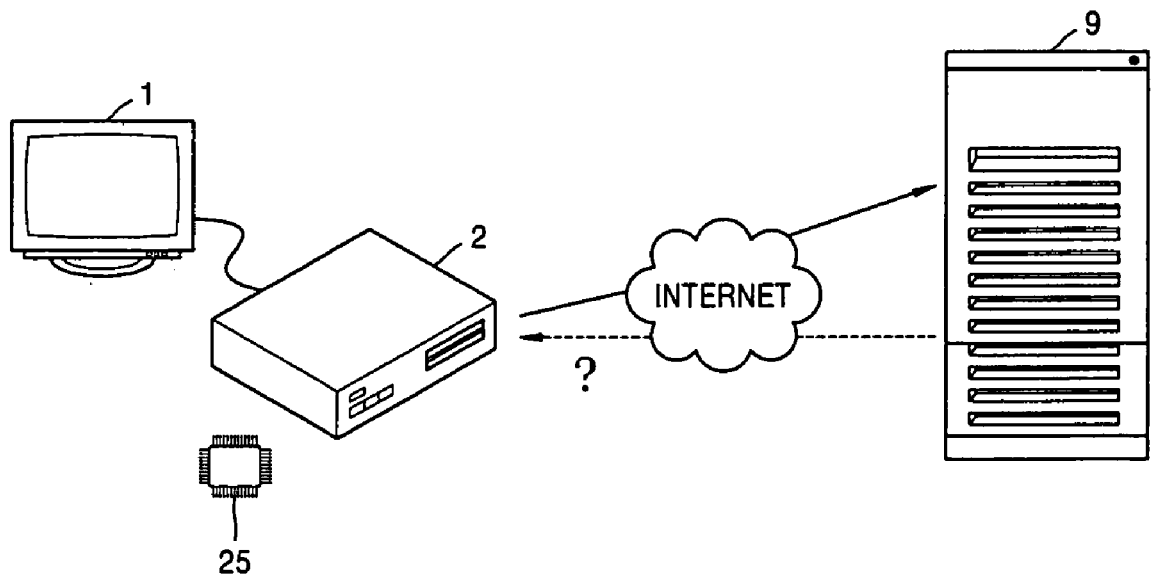

Reference will now be made in detail to the present embodiments of the present invention, examples of the which will be described in detail with reference to the accompanying drawings, wherein like reference numerals refer to the like elements throughout. The embodiments are described below in order to explain the present invention by referring to the figures.

As used in this specification, "ENAV (ENhanced AV) data" indicates all data for supporting an interactive mode. For example, in a case where a DVD-Video is reproduced in an interactive mode, the interactive data is classified into a markup document and a markup resource inserted in the markup document. The "markup document" indicates all documents (for example, A.xml) which are created using markup languages including XML, HTML, etc. The "markup resource" indicates all files A.png, A.jpg, A.mpeg, etc. inserted in the A.xml. Specifically, the markup document acts as an application needed for reproducing AV data in an interactive mode itself, along with inserted program codes, or along with program codes provided as a separate external file, and simultaneously acts as ENAV data to be displayed together with the AV data.

Figure 2:
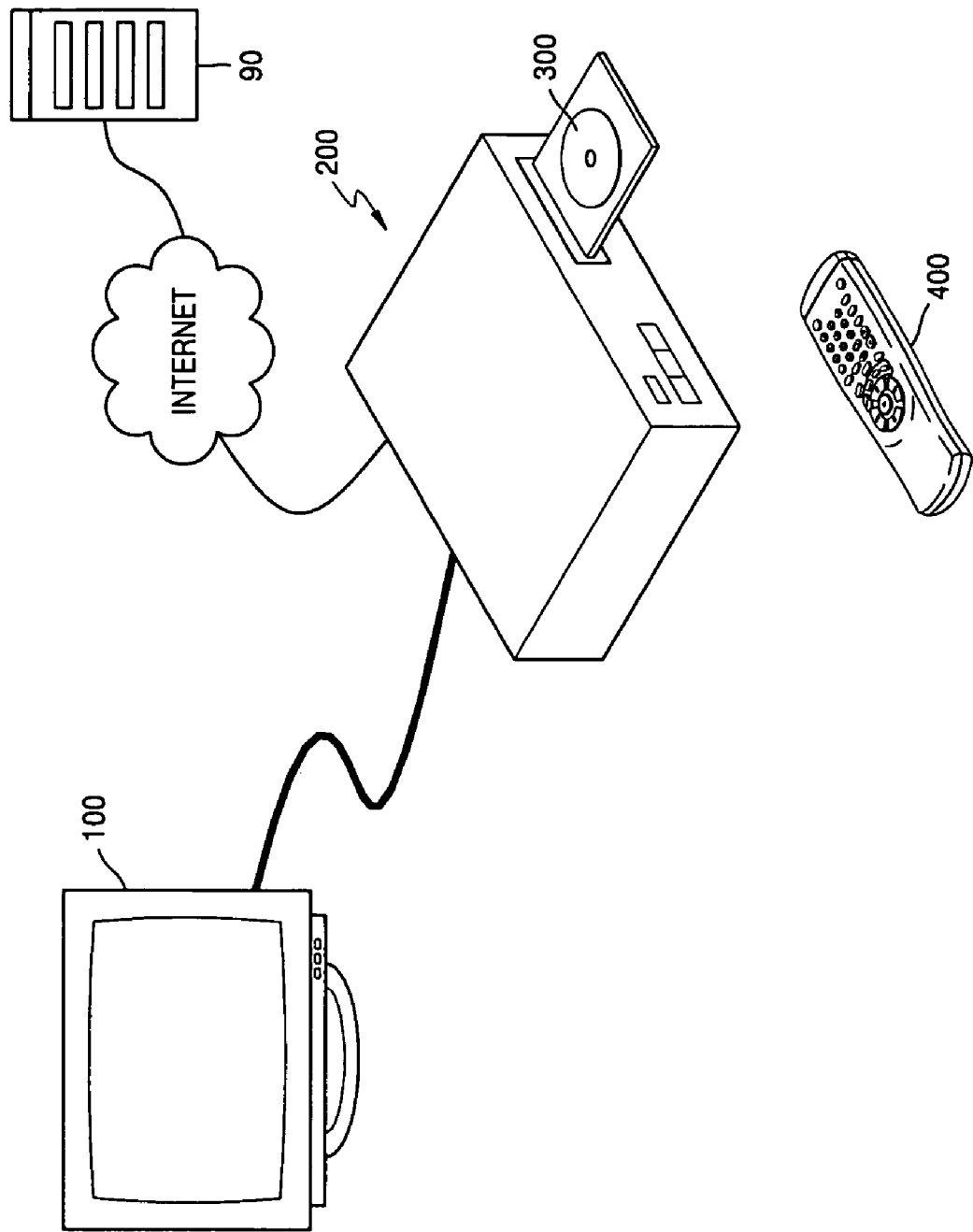
FIG. 2 schematically shows a recording and/or reproducing system according to an embodiment of the present invention.

FIG. 2 schematically shows a recording and/or reproducing system according to an embodiment of the present invention. Referring to FIG. 2, the recording and/or reproducing system records and/or reproduces data with respect to a DVD 300, which is an information storage medium according to an aspect of the present embodiment. The system includes a recording and/or reproducing apparatus 200 for use with the DVD 300, a television 100, which is a display device according to an aspect of the present embodiment, and a remote controller 400, which is a user input device according to an aspect of the invention. The remote controller 400 receives a control command from a user and transfers the command to the recording and/or reproducing apparatus 200. The recording and/or reproducing apparatus 200 accesses the Internet and transmits or receives desired ENAV data. The recording and/or reproducing apparatus 200 performs buffer management for supporting an interactive mode using the ENAV data according an aspect of to the present invention. The detailed descriptions for the buffer management will be described below. While shown as being separate, it is understood that a display can be built directly into the apparatus 200, such as for portable devices such as portable DVD players, personal digital assistants, mobile phones, and other device having an integrated display.

Also, the recording and/or reproducing apparatus 200 includes a DVD drive (not shown) for reading data recorded on the DVD 300 and which is included in the apparatus 200 or is connectable to the apparatus 200. If the DVD 300 is loaded in the DVD drive and a user selects the interactive mode, the recording and/or reproducing apparatus 200 reproduces a corresponding AV data in the interactive mode using a corresponding markup document and transfers the reproduced result to the television 100. The television 100 displays a combined picture of a markup picture obtained from the markup document and an AV picture embedded in the markup picture. The "interactive mode" indicates a method of displaying AV data on a display window defined in a markup document, and more specifically, a method of displaying AV data so that an AV picture is embedded in an interactive picture. Here, the AV picture represents a reproduced picture of the AV data displayed on a television 100, and the interactive picture represents a picture being shown in the interactive mode (i.e. a picture in which an AV picture is embedded). The "video mode" indicates a method of reproducing AV data according to a method defined in a conventional DVD-Video (i.e. a method of displaying on a television 100 only an AV picture obtained by reproducing the corresponding AV data).

In the present embodiment, the recording and/or reproducing apparatus 200 supports both the interactive mode and the video mode. However, it is understood that the apparatus 200 need not support both modes. Moreover, it is understood that the DVD 300 can be other read-only, write-once, or rewritable storage media including, but not limited to magnetic media, magneto-optical media, optical media, such as Compact Discs (CDs), and next-generation DVDs including Blu-ray discs, Advanced Optical Discs (AODs), and Enhanced Versatile Discs (EVDs), flash media, or other media. Additionally, the user input device need not be the remote controller 400, and can be a touch screen display, a keyboard, a mouse, or any device by which commands are input. While described in terms of a television 100, it is understood that other types of displays can be used, such as flat panel displays, plasma display panels, liquid crystal displays and/or OLEDs. Lastly, while not shown, it is understood that the audio produced by the apparatus 200 can be output through speakers included in the apparatus 200, or through speakers, head phones or other audio output device connectable to the apparatus 200 to output audio data.

Figure 3:
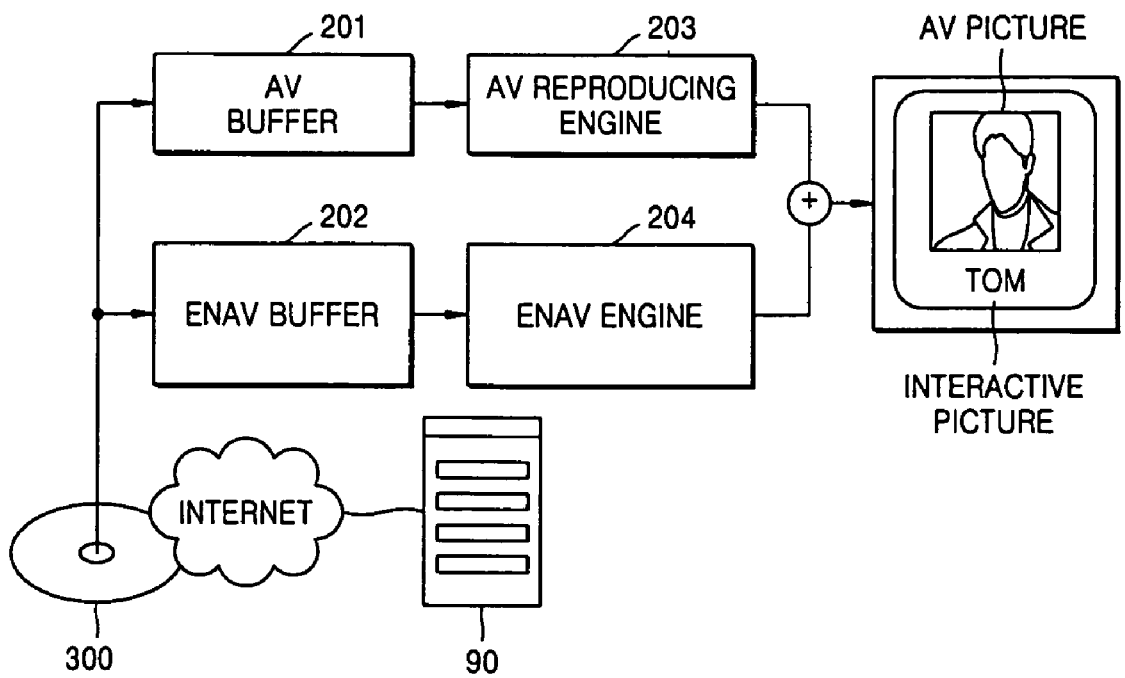
FIG. 3 is a block diagram of a recording and/or reproducing apparatus of FIG. 2.

FIG. 3 is a block diagram of the recording and/or reproducing apparatus 200 according to an aspect of the invention. Referring to FIG. 3, the reproducing apparatus 200 comprises an AV buffer 201, an ENAV buffer 202, an AV recording and/or reproducing engine 203, and an ENAV engine 204. The AV buffer 201 is a buffer for buffering the AV data and the ENAV buffer 202 is a buffer for buffering ENAV data. In the shown embodiment, the AV data is DVD-Video data recorded on the DVD 300 according to a DVD-Video format. However, the AV data can be of other formats, such as formats being received from the Internet. In the shown embodiment, the ENAV data includes markup documents and/or markup resources. The AV buffer 201 and the ENAV buffer 202 can be separate memory chips or can be one memory chip in hardware. Moreover, while described in terms of video, it is understood that the AV data can be audio data, such as DVD-Audio, be image data or video data, or other data which is read from the DVD 300 or other type of storage medium and reproduced with the ENAV data in the interactive mode.

The AV reproducing engine 203 decodes and outputs the AV data. In the shown embodiment, the AV reproducing engine 203 includes an MPEG decoder capable of decoding DVD-Video data. The ENAV engine 204 is an interpretation engine that interprets and executes the ENAV data to be combined and displayed with the decoded AV data in the interactive mode. The ENAV engine 204 supports the interactive mode and the video mode. In view of software used in an embodiment of the invention, the ENAV engine 204 includes a markup document viewer that interprets and shows the markup documents, a browser for getting desired data from the Internet, and a markup resource decoder that decodes the markup resources. The output from the ENAV engine 204 and the output from the AV reproducing engine 203 are blended, to form an interactive picture. The interactive picture is displayed on the television 100.

The assignee of the present applicant has filed a plurality of patent applications related to various methods in which an AV picture is embedded and displayed in an interactive picture. For example, there are Korean Patent Application No. 2001-33526 filed on Jun. 14, 2001 (filed in the United States as U.S. patent application Ser. No. 10/170,419 filed on Jun. 14, 2002, now abandoned), Korean Patent Application No. 2001-64943 filed on Oct. 20, 2001 (filed in the United States as U.S. patent application Ser. No. 10/165,427 filed on Jun. 10, 2002, now U.S. Pat. No. 7,376,338), Korean Patent Application No. 2001-65391 filed on Oct. 23, 2001 (filed in the United States as U.S. patent application Ser. No. 10/277,094 filed on Aug. 22, 2002, currently pending), and Korean Patent Application No. 2002-50524 filed on Aug. 26, 2002 (filed in the United States as U.S. patent application Ser. No. 10/647,445 filed on Aug. 26, 2003, currently pending), the disclosures of which are incorporated by reference. As such, additional details with regard to these methods are not provided.

Furthermore, the ENAV engine 204 manages the ENAV buffer 202 according to an aspect of the present invention. That is, the ENAV engine 204 allocates a desired area within the ENAV buffer 202 for loading a desired ENAV file containing ENAV data on the basis of ENAV buffer configuration information to be an updateable markup area. The ENAV engine 204 then loads the corresponding ENAV file in the allocated area. A file containing the ENAV data is called an ENAV file. Also, the ENAV engine 204 manages the updateable markup area of the ENAV buffer 202 according to configuration information of the updateable markup area.

Figure 4:
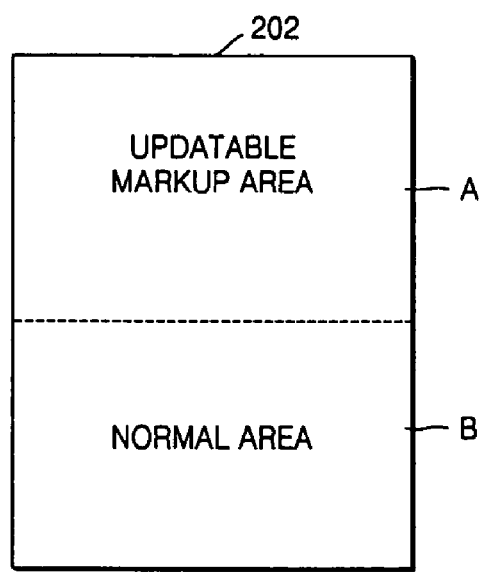
FIG. 4 is a reference view for describing ENAV buffer configuration information according to an aspect of the invention.

FIG. 4 is a reference view for describing ENAV buffer configuration information according to an embodiment of the present invention. Referring to FIG. 4, the ENAV buffer 202 is divided logically and physically into two areas A and B. The area A is the updateable markup area and is an area allocated for storing ENAV data, markup documents, and markup resources. The area B is a normal area and is used for storing markup documents not requiring updating, for example, a Cascade Style Sheet (CSS) file designating a style of a markup document, a script file, an image file, a font file, etc. That is, the ENAV buffer configuration information includes information regarding a size of an updateable markup area in the ENAV buffer 202. The remaining area excluding the size is the normal area. As such, since the ENAV buffer 202 includes the updateable markup area, an Internet service (for example, a chat service) to be described later can be provided although a storage capacity of the ENAV buffer 202 is small.

As a detailed embodiment, a chat service that is provided using the updateable markup area is described as follows. However, it is understood that other Internet Services can be used instead of or in addition to the chat service.

Figure 5:
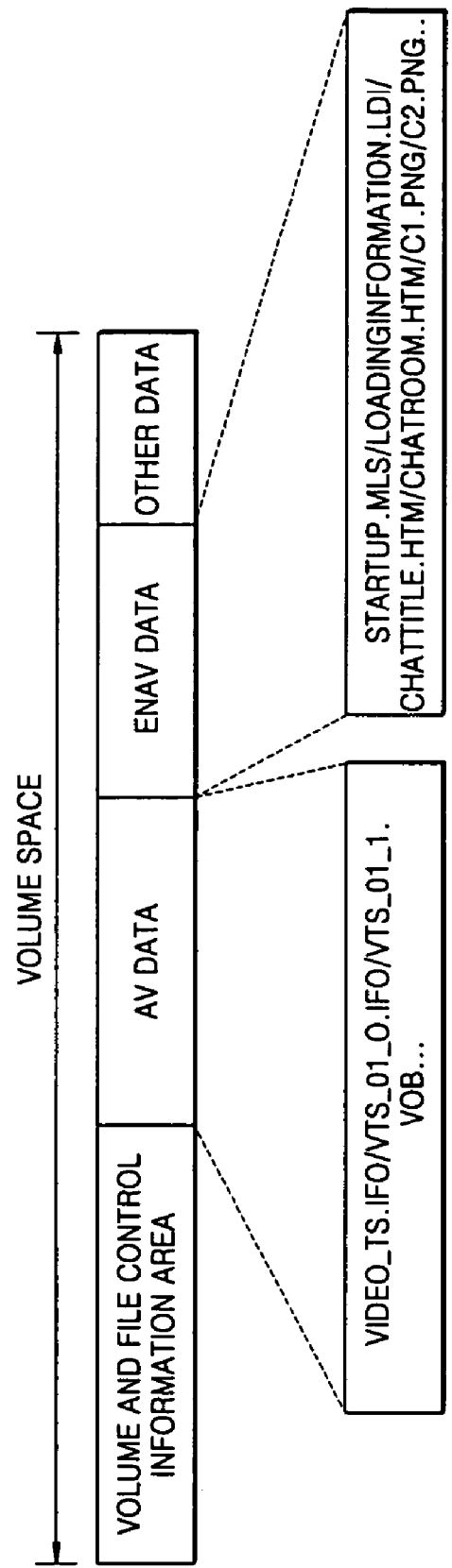
FIG. 5 illustrates a volume space of a DVD according to an embodiment of the present invention.

FIG. 5 illustrates a volume space of the DVD 300 according to an embodiment of the present invention. Referring to FIG. 5, the volume space of the DVD 300 includes a Volume and File control information area, an AV data area, an ENAV data area, and an other data area. The Volume and File control information area stores volume and file control information for the whole DVD 300. The AV data area stores video titles, VIDEO_TS.IFO, VTS_01_0.IFO, VTS_01_1.VOB, and the like, with each title being the AV data recorded according to the DVD-Video format. VIDEO_TS.IFO is a file including reproduction control information for all the video titles. The VTS_01_0.VOB, VTS_01_1.VOB and the like are files for constructing a video title set (i.e., video objects (VOB)). Each VOB contains a video object unit (VOBU) including a navigation pack, a video pack, and an audio pack. The detailed construction thereof is disclosed in a DVD-Video standard, "DVD-Video for Read Only Memory disc 1.0," the disclosure of which is incorporated by reference, and is therefore not repeated.

The ENAV data area stores the ENAV data for supporting an interactive mode. That is, the interactive data area stores a markup document, such as STARTUP.MLS, to be displayed first when the interactive mode is selected, an loading information file, such as LoadingInformation.LDI, containing configuration information of an updateable markup area, and ENAV buffer configuration information according an aspect of to the present invention. The interactive data area further stores markup document files, such as CHATTITLE.HTM and CHATROOM.HTM for providing a chat service. Additionally, the interactive data area includes markup resources, such as $C_1$.PNG, $C_2$.PNG, . . . . The other data area stores files containing the other data.

Figure 6:
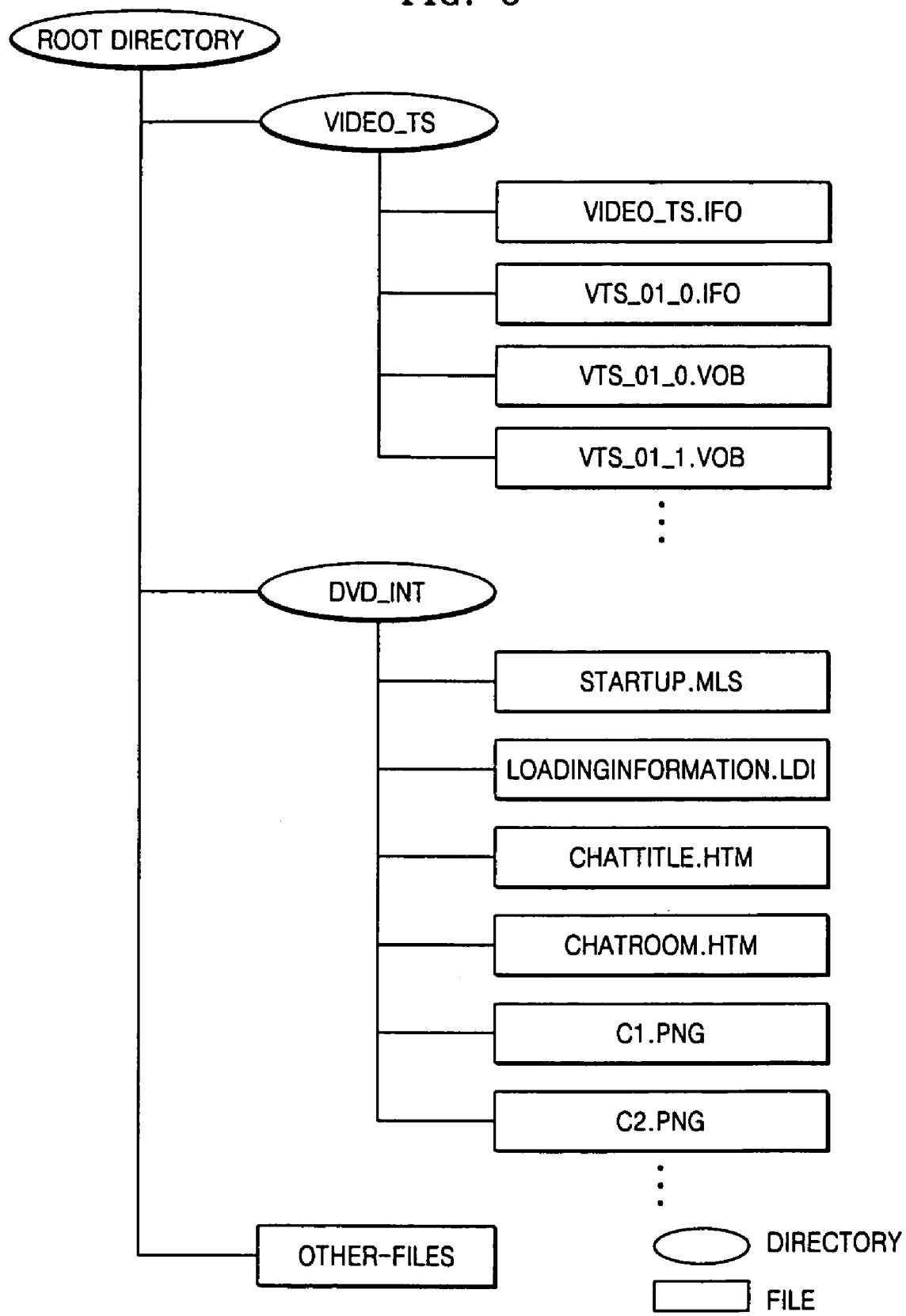
FIG. 6 illustrates a directory structure of the DVD according to an embodiment of the present invention.

FIG. 6 illustrates a directory structure of the DVD 300 according to an embodiment of the present invention. Referring to FIG. 6, a root directory has a video directory VIDEO_TS including the AV data. The video directory VIDEO_TS includes a file VIDEO_TS.IFO, which stores navigation information for the video titles, a file VTS_01_0.IFO, which stores navigation information for a first video title set, and files VTS_01_0.VOB, VTS_01_1.VOB, . . . , for constructing the video title set. The root directory also includes an interactive directory DVD_ENAV, which stores the information for supporting the interactive mode. The interactive directory DVD_ENAV includes the markup document STARTUP.MLS to be displayed with a video title, the loading information file LoadingInformation.LDI containing configuration information of an updateable markup area and ENAV buffer configuration information according aspects of to the present invention, markup documents CHATTITLE.HTM and CHATROOM.HTM for providing a chat service, and the markup resources C1.PNG, C2.PNG.

FIG. 7 shows an example of a startup file STARTUP.MLS according to an embodiment of the present invention. Referring to FIG. 7, a startup file STARTUP.MLS as a markup document created with a markup language includes an element "loadinginfo". The label C indicates a portion of the STARTUP.MLS which links a loading information file to the startup file using the element "loadinginfo". That is, the element "loadinginfo" links the loading information file LoadingInformation.LDI shown in FIG. 8 including location information of required ENAV files to the startup file, in order to load the required ENAV files to be reproduced in an interactive mode. As described above, the loading information file includes the ENAV buffer configuration information according to an aspect of the present invention.

FIG. 8 shows an example of a loading information file LoadingInformation.LDI according to an embodiment of the present invention. Referring to FIG. 8, in the shown loading information file LOADINGINFORMATION.LDI, a label D indicates a portion which stores the ENAV buffer configuration information using an element "memory." The element "memory" is an empty element without nesting other elements and has two attributes for indicating a name of a memory area and a memory size. The shown attributes are a "name" attribute and a "size" attribute. The "name" attribute specifies the name of the memory area. As shown, "um" indicates an updateable markup area. The "size" attribute indicates the size of a memory area. The size of a memory area is dependent on the size of the ENAV buffer 202. For example, if the ENAV buffer 202 is 36 MB, the memory area can have a size from 0 byte to 36 MB. It is understood that the attributes can be otherwise provided, and that the name can be any name and need not be "um" in all aspects of the invention.

In the shown embodiment, the "name" attribute is "um" and the "size" attribute is "6 KB". Thus, the shown element "memory" indicates that 6 KB is allocated to be an updateable markup area designated as "um" of the ENAV buffer 202. The remaining area is a normal area.

Further, the loading information file stores names and locations information of ENAV files to be loaded in advance in the buffer 202 according to an aspect of the invention. In the shown example, the files to be loaded in advance are for providing the chat service. A file which should be first displayed for the chat service is represented by a markup document CHATROOM.HTM using an element "initial". The remaining required files are represented respectively by markup documents CHATTITLE.HTM, C1.PNG, C2.PNG, INPUT.HTM, P1.GIF, DIALOG.HTM, and DIALOG.CSS, using elements of "entity". Here, it is seen that the markup documents CHATTITLE.HTM, C1.PNG, and C2.PNG are stored on the DVD 300. It is also shown that the markup documents INPUT.HTM, P1.GIF, DIALOG.HTM, and DIALOG.CSS are stored in an Internet server 90 shown on FIG. 13 located at "http://www.company.com." Specifically, it is seen that the markup documents DIALOG.HTM and DIALOG.CSS are loaded to the updateable markup area as these files are designated for the "um" section of the ENAV buffer 202.

Figure 9:
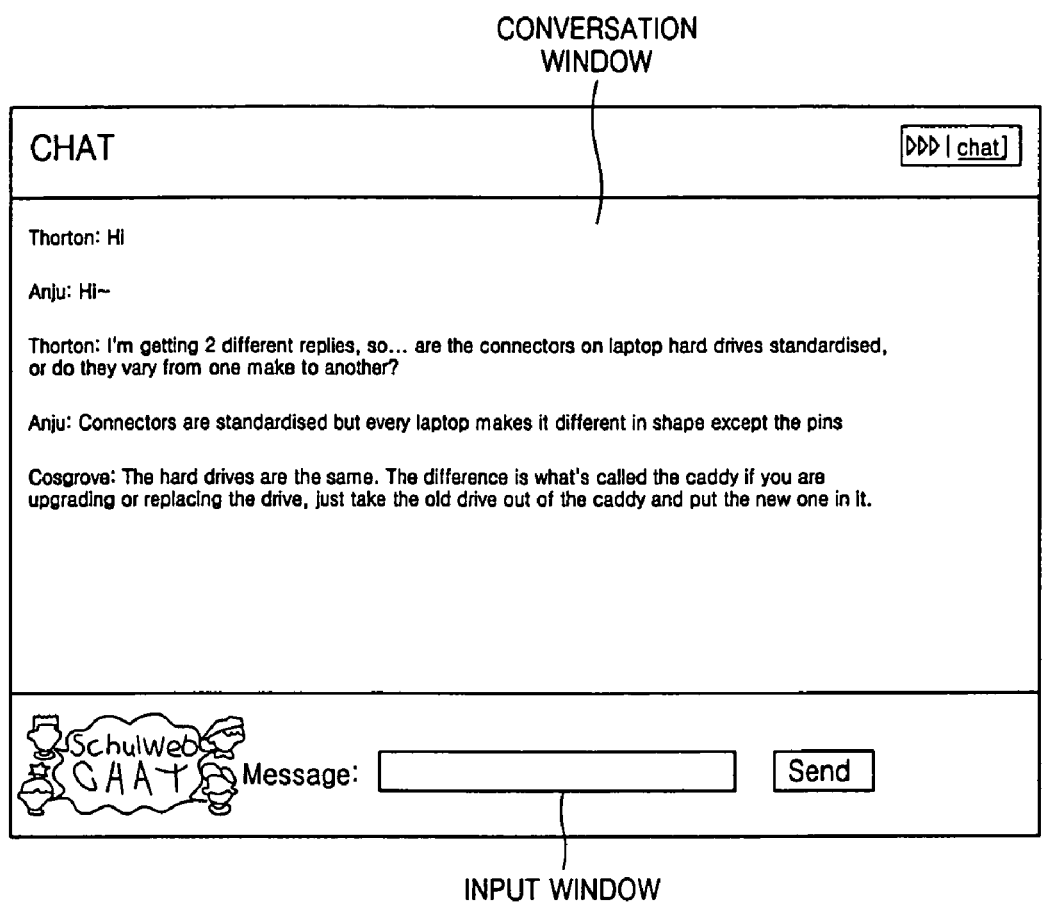
FIG. 9 shows an example of a chat screen for a chat service supported by a recording and/or reproducing apparatus 200 according to an embodiment of the present invention.

FIG. 9 shows an example of a chat screen for a chat service supported by the recording and/or reproducing apparatus 200 according to an embodiment of the present invention. Referring to FIG. 9, the chat screen has a conversation window that displays conversation contents between users participating a chat, and an input window to which one party participating the chat inputs his/her texts. If a user inputs his/her texts on the input window and clicks a send button<send> made on the chat screen, the recording an/or reproducing apparatus 200 sends the texts to a server 90 shown in FIG. 13 which provides the chat service over the Internet. The recording and/or reproducing apparatus 200 displays an updated markup document and accordingly the texts just input by the user are displayed on the conversation window.

FIGS. 10 through 12 show exemplary markup documents for the chat screen of FIG. 9. Referring to FIG. 10, a markup document CHATROOM.HTM is stored in on the DVD 300 and is a markup document to be first displayed when a user selects the chat service. The markup document CHATROOM.HTM is linked with a markup document CHATTITLE.HTM stored in the disk 300 for displaying a chat title, and is also linked with a markup document DIALOG.HTM which is stored in a server 90 shown in FIG. 13 located at http://www.company.com providing the chat service and is frequently updated for displaying a conversation window. Referring to FIG. 11, the markup document DIALOG.HTM is updated whenever the user inputs his/her texts and indicates that it is a markup document provided from the server 90 shown in FIG. 13 located at http://www.company.com. Referring to FIG. 12, a markup document INPUT.HTM is provided from the server 90 shown in FIG. 13 located at http://www-.company.com to display an input window on a chat screen.

Figure 13:
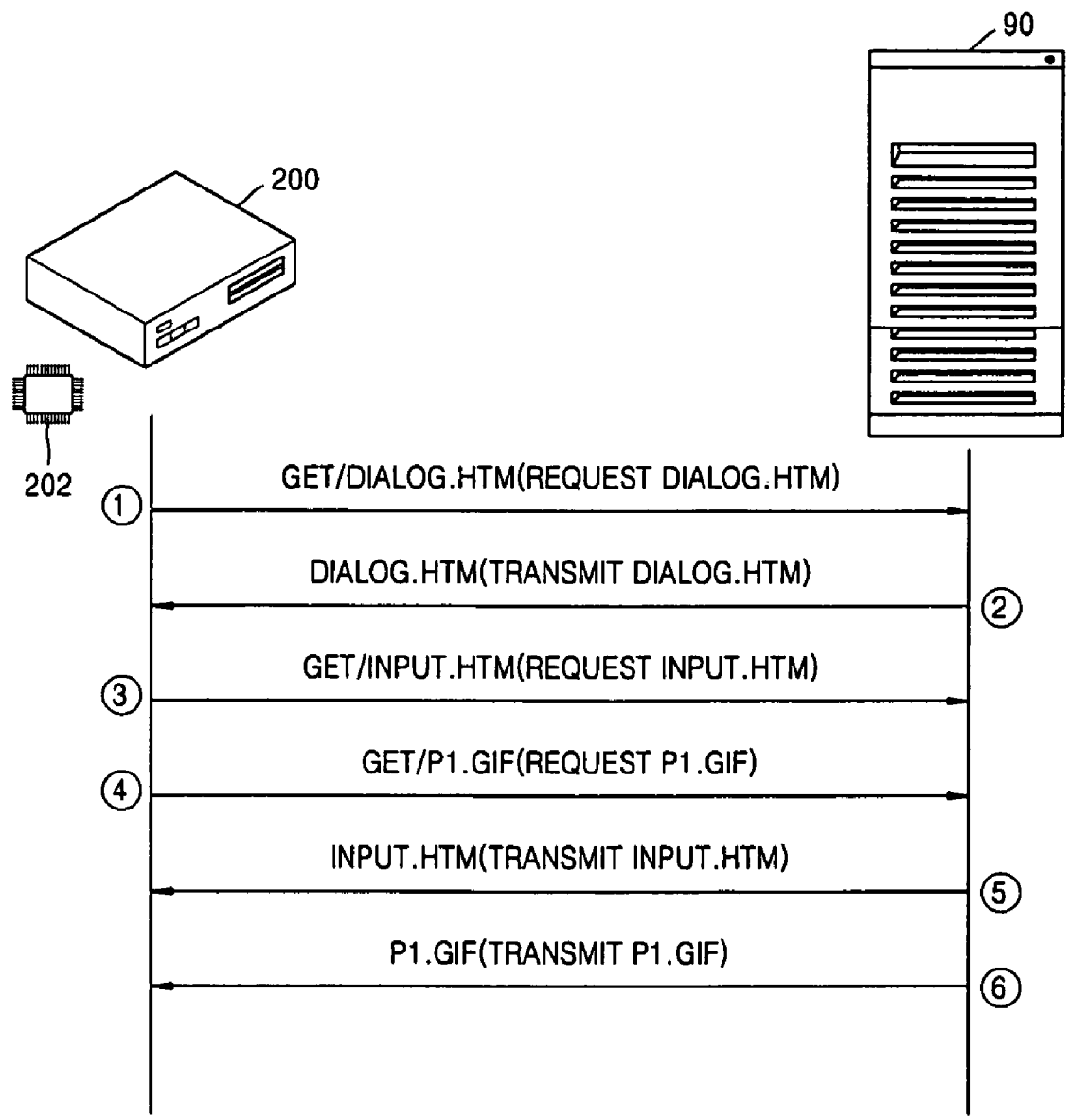
FIG. 13 is a view for explaining a communication process between the recording and/or reproducing apparatus and a server for providing the chat service according to an embodiment of the present invention.

FIG. 13 is a view for explaining a communication process between the recording and/or reproducing apparatus 200 and the server 90 for providing the chat service according to an embodiment of the present invention. Referring to FIG. 13, the recording and/or reproducing apparatus 200 includes the ENAV buffer 202 with a predetermined capacity. The server 90 provides a chat service to the recording and/or reproducing apparatus 200 over the Internet. The recording and/or reproducing apparatus 200 and the server 90 perform communications according to a client-server model. In this embodiment, communication is performed according to a HyperText Transfer Protocol (HTTP) protocol of TCP/IP on the basis of the client-server model. However, it is understood that other client-server models and/or protocols can be used.

If the recording and/or reproducing apparatus 200 accesses the server 90 and requests a markup document DIALOG.HTM for displaying a conversation window using a GET command (communication operation (1)), the server 90 sends the requested markup document DIALOG.HTM to the recording and/or reproducing apparatus 200 (communication operation (2)). It is understood that the recording and/or reproducing apparatus 200 can use a PUSH command instead of the GET command. Likewise, if the recording and/or reproducing apparatus 200 requests a markup document INPUTHTM for displaying the input window using the GET command (communication operation (3)), and requests a markup resource P1.GIF (communication operation (4)), the server 90 sends the requested markup document INPUT HTM and the markup resource P1.GIF to the recording and/or reproducing apparatus 200 (communication operations (5) and (6)).

Meanwhile, when updating a desired file (markup document and/or markup resource), the server 90 makes the corresponding file have a size equal to or small than a buffer capacity allocated to the corresponding file, as will be described later, so that the recording and/or reproducing apparatus 200 can correctly receive the updated file.

FIGS. 14 and 15 show examples for executing operations (1) and (2), respectively, in the communication process of FIG. 10. FIG. 14 shows an example of a case of getting a markup document DIALOG.HTM for displaying a conversation window on a chat screen using a loading information file LOADINFO.LDI containing the ENAV buffer configuration information. In FIG. 14, operation (1) shows the configuration of a request header for allowing the recording and/or reproducing apparatus 200 to send a GET command to the server 90 according to the HTTP protocol, (i.e., a REQUEST Header). Specifically, a "User-Agent" indicates a type of the recording and/or reproducing apparatus 200, and "Referer:" indicates that a document referring to the markup document DIALOG.HTM is a buffer configuration information file LOADINFO.LDI stored in the interactive directory of the DVD 300.

Operation (2) is the configuration of a response header transmitted from the server 90 responding to the GET command from the reproducing apparatus 200 as a client, according to the HTTP protocol, (i.e., a RESPONSE Header). Specifically, "Last-modified:" can indicate that the markup document DIALOG.HTM is a document being updated in the server 90 (that is, a changeable document). Accordingly, if there are no "Last-modified:" in the RESPONSE header from the server 90, the recording and/or reproducing apparatus 200 can consider the corresponding markup document or the corresponding markup resource as a non-changeable document.

FIG. 15 shows an example of a case of getting a markup document DIALOG.HTM for displaying a conversation window on a chat screen using a markup document CHATROOM.HTM. Operation (1) shows the configuration of a request header for allowing the recording and/or reproducing apparatus 200 to send a GET command to the server 90 according to the HTTP protocol (i.e., a REQUEST Header). Specifically, a "User-Agent" indicates a type of the recording and/or reproducing apparatus 200, and "Referer:" indicates that a document referring to the markup document DIALOG.HTM is a markup document CHATROOM.HTM stored in the interactive directory of the DVD 300. Operation (2) shows the configuration of a response header transmitted from the server 90 responding to the GET command from the reproducing apparatus 200 as a client, according to the HTTP protocol, (i.e., a RESPONSE Header). Specifically, a "Last-modified:" can indicate that the markup document DIALOG.HTM is a document being updated in the server 90 (that is, a changeable document). Accordingly, if there are no "Last-modified:" in the RESPONSE Header from the server 90, the recording and/or reproducing apparatus 200 can consider the corresponding markup document or the corresponding markup resource as a non-changeable document. As shown in operation (2) of FIG. 15, the "Last-Modified:" indicates a modification of the document since the operation (2) shown in FIG. 14, indicating a changeable document to be updated in the allocated area.

FIG. 16 is a view showing configuration information of an updateable markup area decided based on the ENAV buffer configuration information, according to an embodiment of the present invention. Referring to FIG. 16, the configuration information of the updateable markup area is information recorded on the DVD 300 (included in the loading information file for the chat service in this embodiment). The configuration information includes location information of the ENAV files and size information of buffer areas to be allocated to the corresponding ENAV files. Also, the configuration information of the updateable markup area can further include information indicating formats of the corresponding ENAV files and information indicating whether the corresponding ENAV files are updated in the server 90. However, it is understood that the configuration information could contain additional information.

The location information indicates the location of the ENAV file as being on the server 90 capable of communicating with the recording and/or reproducing apparatus 200 including the ENAV buffer 202, or on the DVD 300 loaded in the reproducing apparatus 200 including the ENAV buffer 202. As shown, the location information indicating the server 90 is represented as 'http://www.company.com/DIALOG.HTM', and location information indicating the DVD 300 is represented as 'file://DVD_ENAV/CHATROOM.HTM'. The shown memory size information represents 5 KBytes. However, it is understood that all files do not need to include the memory size information. Meanwhile, text/xml+chat (yes) as an example of a file type (update), indicates that the corresponding file is a text file, is an xml document, is used for chatting, and is updated in the server 90 (yes). While shown as being at the same server 90, it is understood that the location can be from multiple servers. Moreover, the non-internet files need not all be from the DVD 300 and instead might be read from other memories or drives accessible by the apparatus 200.

Figure 17:
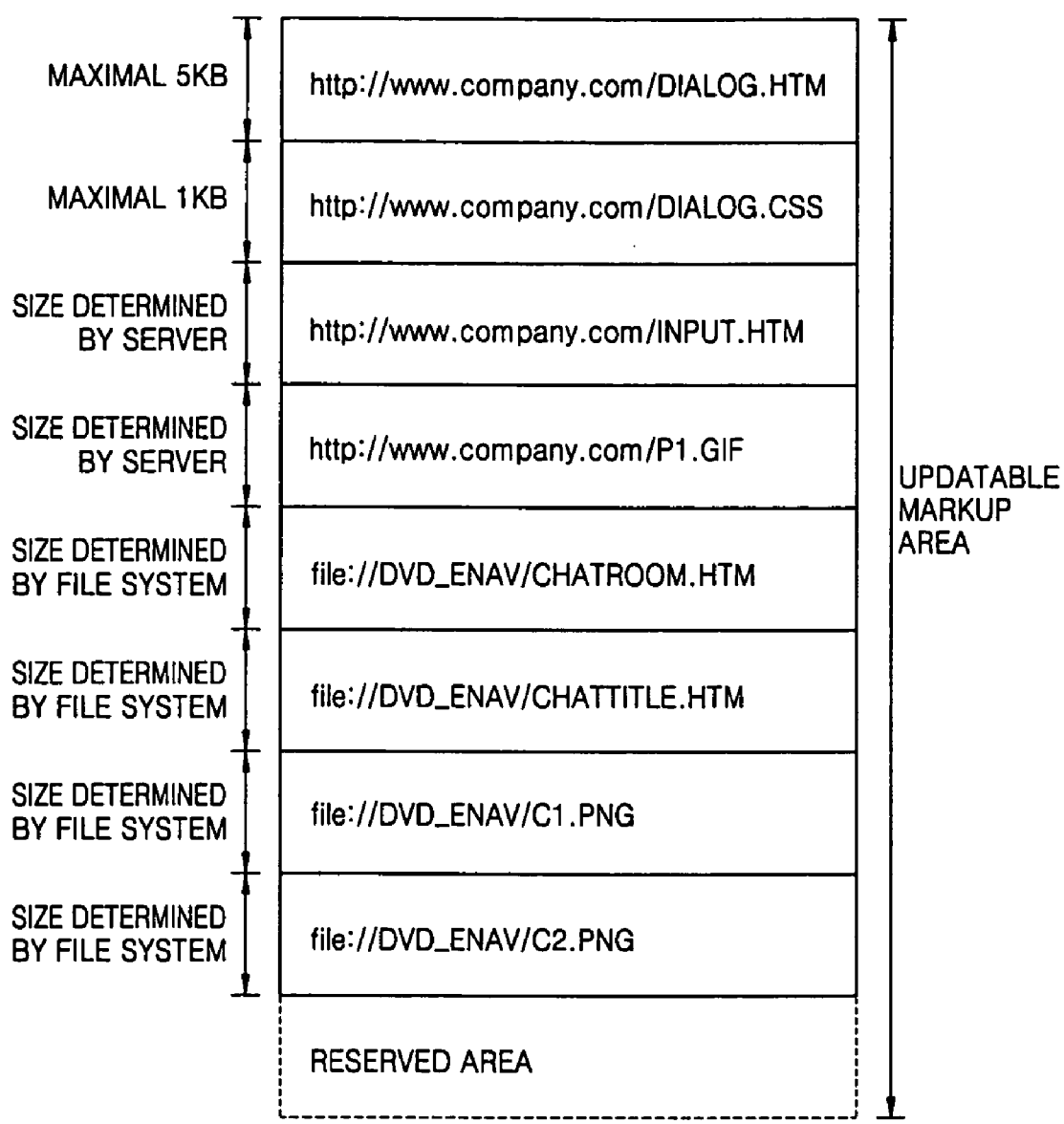
FIG. 17 shows a configuration of an updateable markup area according to the configuration information of the updateable markup area of FIG. 16.

FIG. 17 shows a configuration of an updateable markup area according to the configuration information of the updateable markup area of FIG. 16. Referring to FIG. 17, in the ENAV buffer 202, buffer areas are allocated according to the configuration information of the markup area of FIG. 16. More specifically, because a buffer size to be reserved for DIALOG.HTM stored at http://www.company.com/DIALOG.HTM is 5 KBytes, the buffer area of 5 KBytes is allocated to DIALOG.HTM. Also, because DIALOG.CSS stored at http://www.company.com/DIALOG.CSS is 1 KBytes, the buffer area of 1 KByte is allocated to DIALOG.CSS. Because there is no buffer size information for INPUT.HTM and P1.GIF stored respectively at http://www.company.com/INPUT.HTM and at http://www.company.com/P1.GIF, the buffer areas for INPUT.HTM and P1.GIF are determined by the server 90. The server 90 can allocate a size of a transmitting file through 'Content-length:' of a RESPONSE Header, as described above with reference to FIGS. 14 and 15.

File://DVD_ENAV/CHATROOM. HTM, file://DVD_ENAV/CHATTITLE.HTM, file://DVD_ENAV/C1.PNG, and file://DVD_ENAV/C2.PNG indicate that corresponding files thereof, CHATROOM.HTM, CHATTITLE.HTM, C1.PNG, and C2.PNG are stored in the DVD 300, respectively. Therefore, the buffer areas for the files are allocated according to file sizes set by a file system of the recording and/or reproducing apparatus 200.

Buffer management methods according to embodiments of the present invention will be described below with reference to FIGS. 18 and 19 on the basis of the above-described configuration.

Figure 18:
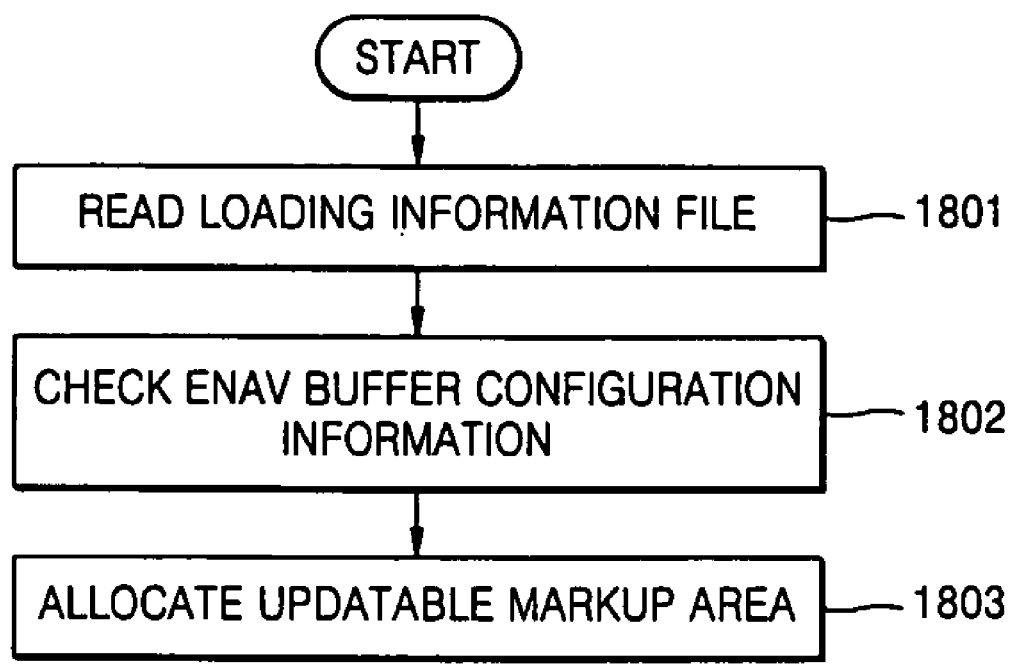
FIG. 18 is a flowchart for explaining a buffer management method according to an embodiment of the present invention.

FIG. 18 is a flowchart for explaining a buffer management method according to an embodiment of the present invention. Referring to FIG. 18, when the DVD 300 is loaded in the recording and/or reproducing apparatus 200 and a user selects an interactive mode, the reproducing apparatus 200 opens a startup file STARTUP.MLS included in the DVD_ENAV directory and reads a loading information file LoadingInformation.LDI containing the ENAV buffer configuration information according to an aspect of the present invention which is linked to the startup file STARTUP.MLS in operation 1801. The recording and/or reproducing apparatus 200 checks the ENAV buffer configuration information through the loading information file in operation 1802 and allocates an updateable markup area in the ENAV buffer 202 according to the checked result in operation 1803. The remaining area of the ENAV buffer 202 is a normal area as has been described above.

Figure 19:
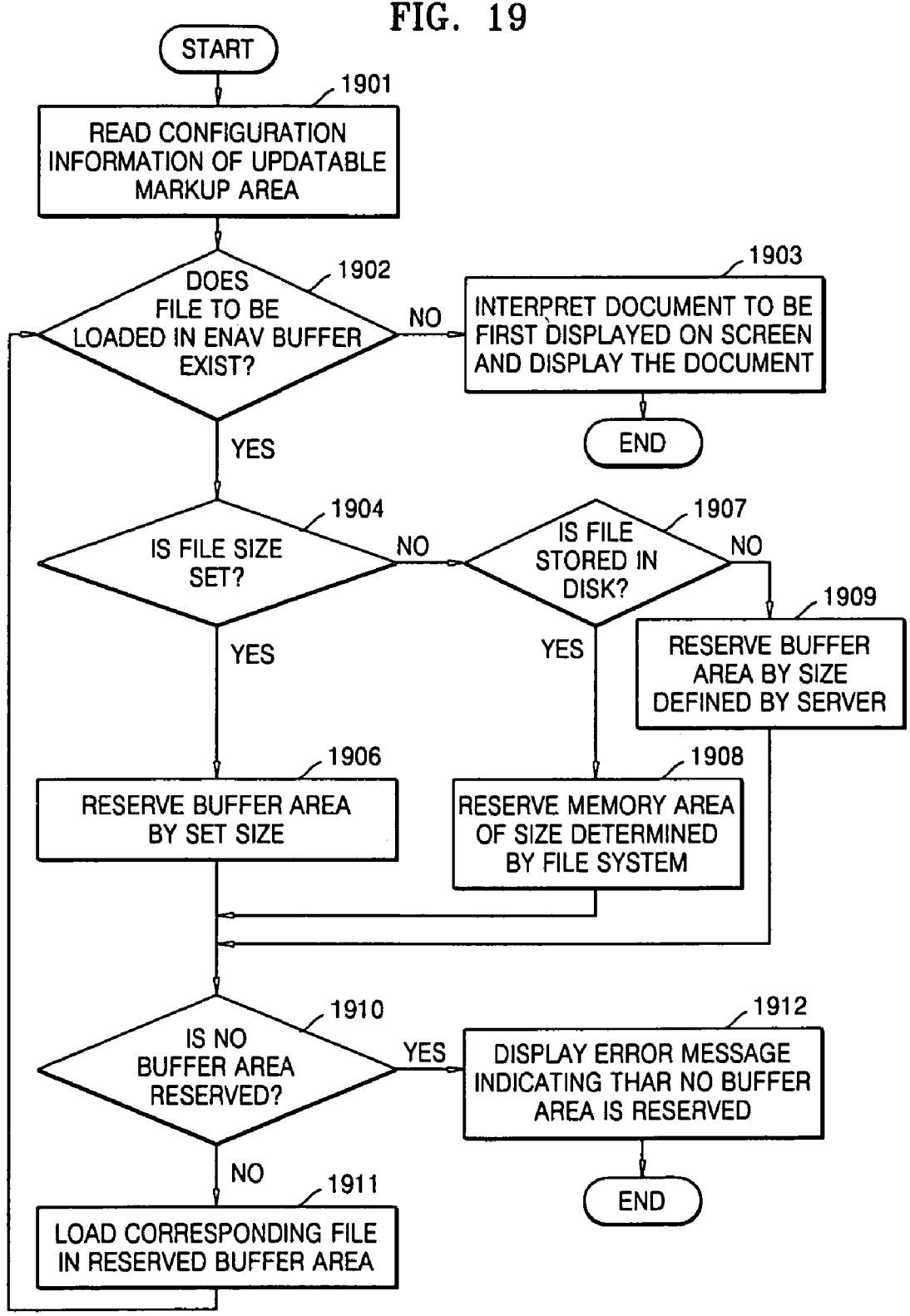
FIG. 19 is a flowchart for explaining a buffer management method according to another embodiment of the present invention.

FIG. 19 is a flowchart for explaining a buffer management method according to another embodiment of the present invention. Referring to FIG. 19, when a user selects a chat service, the recording and/or reproducing apparatus 200 interprets a startup file recorded on the DVD 300, and reads a loading information file containing configuration information of an updateable markup area as ENAV buffer configuration information for providing the selected chat service (operation 1901).

The recording and/or reproducing apparatus 200 determines through information included in the loading information file whether a file to be loaded in an ENAV buffer 202 exists (operation 1902). If no file to be loaded in the ENAV buffer 202 exists, the reproducing apparatus 200 interprets a document to be initially displayed on a screen and displays the interpreted document on the screen (operation 1903).

If a file to be loaded in the ENAV buffer 202 exists, the recording and/or reproducing apparatus 200 determines whether a size of the file has been set (operation 1904). If the file size has been set, the recording and/or reproducing apparatus 200 reserves a buffer area corresponding to the set file size (operation 1906). If the file size has not been set, the recording and/or reproducing apparatus 200 detects a location of the file (operation 1907). If the file is stored in the DVD 300 according to the detected result, the recording and/or reproducing apparatus 200 reserves a buffer area corresponding to a size defined by a file system (operation 1908). For instance, the file system can have information of a name, attribute, and size of a file such that the size defined by a file system indicates a size of the file stored on the DVD 300. If the file is stored in the server 90 according to the detected result, the recording and/or reproducing apparatus 200 reserves a buffer area corresponding to a size defined by the server 90 (operation 1909).

When a buffer area is reserved in operation 1910, the recording and/or reproducing apparatus 200 loads the corresponding file to the reserved buffer area (operation 1911). If no buffer area is reserved, the recording and/or reproducing apparatus 200 sends a message indicating that no buffer area is reserved and process is terminated (operation 1912). Lastly, if a request requiring another buffer configuration information is generated while a user searches for a markup document, the process is returned to operation 1902 and the same operations are repeated for the another buffer configuration information.

If the user searches for the markup document and determines that DIALOG.HTM is updated in the server 90, the recording and/or reproducing apparatus 200 receives the updated DIALOG.HTM from the server 90. If the server 90 controls the size of the updated markup document to be within a predetermined buffer size (in the above example, 5 KBytes) when updating the markup document (and/or markup resource), the recording and/or reproducing apparatus 200 can correctly process and display the updated contents without error generation due to a buffer shortage. Furthermore, if a request needing another memory configuration information is generated when the markup document is searched for, the recording and/or reproducing apparatus 200 is returned to operation 1902 and repeats the same operations.

The buffer management methods shown in FIGS. 18 and 19 may be embodied in a general or special purpose digital computer by running a program encoded on a computer-readable medium readable by the computer. Examples of the computer-readable medium include, but not limited to, storage media such as magnetic storage media (e.g. ROMs, floppy disks, hard disks, etc.), optically readable media (e.g., CD-ROMs, DVDs, next-generation DVDs such as Blu-ray discs, and AODs, and EVDs, rewritable and write-once media, etc.), and magneto-optical media. It is understood that the server 90 can be connected through various networks including, but not limited to, wireless networks, LAN, WAN, private intranets instead of or in addition to the Internet. Additionally, while the ENAV files are described as being on the server 90, it is understood that the ENAV files can be stored on any external media connected to the apparatus 200 to provide the ENAV files. Lastly, while shown as being divided into two areas, it is understood that the ENAV buffer 202 can be allocated such that more than two areas exist.

As described above, according to the aspects of present invention, when a server provides desired contents to a recording and/or reproducing apparatus as a consumer device supporting an interactive mode, it is possible to adaptively control the size of the contents according to a buffer capacity of the reproducing apparatus, and to allocate a memory using a decisive method in a recording and/or reproducing apparatus being a consumer device with a limited buffer capacity in a manner that the reproducing apparatus reserves a buffer area for an ENAV file in advance before receiving the ENAV file from the server. Accordingly, it is possible to output on a screen markup documents and/or markup resources being freely updated in the Internet, only if a contents provider creates and provides smaller contents than a predetermined size according to memory configuration information.

The markup documents and/or markup resources being freely updated in the Internet include a chat service, a service of providing stock information, a service of providing news, a purchased product list for internet shopping, and other such information to be displayed as an interactive mode. Lastly, the apparatus using the interactive mode can be a stand-alone player/recorder, a portable player/recorder, and any other device which can reproduce in the interactive mode and for which buffer control is required. Moreover, the medium and method of the present invention can be used in a personal computer so as to control and manage the buffer capacities for more efficient use of computational resources.

While the present invention has been particularly shown and described with reference to exemplary embodiments thereof, it will be understood by those of ordinary skill in the art that various changes in form and details may be made therein without departing from the spirit and scope of the present invention as defined by the following claims and equivalents thereof.

What is claimed is:

1. An information storage medium for use in a recording and/or reproducing apparatus, the recording and/or reproducing apparatus comprising an ENAV buffer, the information storage medium comprising:
   an ENAV file containing ENAV data; and
   ENAV buffer configuration information that the recording and/or reproducing apparatus uses to allocate at least a portion of the ENAV buffer into which the ENAV file is to be loaded to be an updateable markup area when the information storage medium is used in the recording and/or reproducing apparatus;
   wherein:
      the updateable markup area of the ENAV buffer is an area to store at least one ENAV file that requires updating; and
      the information storage medium is a physical information storage medium that is readable by the recording and/or reproducing apparatus.

2. The information storage medium of claim 1, further comprising:
   a plurality of ENAV files including the ENAV file, and
   a loading information file including the ENAV buffer configuration information and a name and location information of a predetermined one of the plurality of ENAV files to be read by the apparatus in advance of remaining ones of the plurality of ENAV files, and which is used by the apparatus to determine an order for buffering the plurality of ENAV files into the ENAV buffer.

3. The information storage medium of claim 1, further comprising a loading information file having a memory element including the ENAV buffer configuration information,
   wherein the memory element is used by the apparatus to distinguish whether the ENAV file is an updateable ENAV file to be loaded in the updateable markup area, or is another type of ENAV file to be loaded in another area of the ENAV buffer other than the updateable markup area.

4. The information storage medium of claim 1, further comprising a loading information file having a memory element having an attribute,
   wherein:
      the attribute of the memory element comprises, as the ENAV buffer configuration information, a memory name and a size of the ENAV file, and
      the memory name and the size of the ENAV file are used by the apparatus to distinguish whether the ENAV file is an updateable ENAV file to be loaded in the updateable markup area corresponding to the memory name, or is another type of ENAV file to be loaded in another area of the ENAV buffer other than the updateable markup area which does not correspond to the memory name.

5. The information storage medium of claim 1, further comprising:
   a loading information file including the ENAV buffer configuration file,
   a startup file linked to the loading information file,
   a directory including the loading information file and the ENAV file,
   wherein, in order to read the ENAV buffer configuration information in the loading information file, the apparatus reads the startup file included in the directory to be linked to the loading information file.

6. The information storage medium of claim 1, further comprising an AV file containing AV data,
   wherein the ENAV file is a file used by the apparatus for reproducing the AV file with the buffered ENAV file in an interactive mode.

7. The information storage medium of claim 6, wherein:
   the AV file is created according to a DVD-Video format, and
   the ENAV file includes a markup document created with a markup language and which is interpreted by the apparatus for reproducing the AV file with the ENAV file in the interactive mode.

8. The information storage medium of claim 6, further comprising:
an AV directory including the AV file, and
an ENAV directory other than the AV directory and which includes the ENAV file and a file containing the ENAV buffer configuration information.

9. The information storage medium of claim 1, wherein the ENAV buffer configuration information includes location information used by the apparatus for loading another ENAV file from another information storage medium.

10. The information storage medium of claim 9, wherein the location information comprises a website at which the other information storage medium is accessible from the apparatus.

11. The information storage medium of claim 3, wherein:
the memory element indicates
a location of another ENAV file as being on another storage medium other than the information storage medium from which the other ENAV data is to be read by the apparatus, and
a location of the ENAV file as being on the information storage medium from which the ENAV data is to be read by the apparatus, and
using the memory element, the apparatus:
loads one of the ENAV files determined to be an updateable markup file to be buffered into the allocated updateable markup area of the ENAV buffer, and
loads the other one of the ENAV files determined not to be an updateable markup file into another portion of the ENAV buffer other than the updateable markup area and which is not allocated for the updateable markup file.

12. The information storage medium of claim of claim 11, wherein the other storage medium comprises a server connected to the ENAV buffer.

13. An information storage medium for use in a recording and/or reproducing apparatus in an interactive mode, the recording and/or reproducing apparatus comprising a buffer, the information storage medium comprising:
first data to be reproduced by the recording and/or reproducing apparatus with an interactive file in the interactive mode when the information storage medium is used in the recording and/or reproducing apparatus; and
allocation information that the recording and/or reproducing apparatus uses to allocate a portion of the buffer to be reserved for an interactive type of the interactive file prior to the interactive file being loaded when the information storage medium is used in the recording and/or reproducing apparatus;
wherein the information storage medium is a physical information storage medium that is readable by the recording and/or reproducing apparatus.

14. The information storage medium of claim 13, further comprising identification information which is detected by the apparatus to determine the interactive file to be read and which is used by the apparatus to distinguish between the updateable type of the interactive file to be buffered in the allocated portion and another type of the interactive file to be buffered in another area of the buffer.

15. The information storage medium of claim 13, wherein:
the allocation information comprises an attribute including a name of the allocated portion and a pre-selected size, and
the apparatus allocates the size of the allocated area for the interactive file to be reproduced if the interactive file is associated with the name.

16. The information storage medium of claim 13, wherein the allocation information indicates a size of the allocated portion.

17. The information storage medium of claim 13, further comprising location information which is used by the apparatus to locate the interactive file to be reproduced,
wherein the apparatus uses the read allocation information to detect from the located interactive file a size of the buffer to reserve as the allocated portion.

18. The information storage medium of claim 17, wherein the size of the allocated portion is detected by the apparatus from another information storage medium referenced by the location information.

19. The information storage medium of claim 18, wherein the other information storage medium is on a server external to the apparatus.

20. The information storage medium of claim 13, further comprising order information indicating an order of a plurality of interactive files including the interactive file to be reproduced,
wherein the apparatus buffers the plurality of interactive files in the buffer according to the order.

21. The information storage medium of claim 13, further comprising:
location information of the interactive file to be reproduced and which the apparatus uses to locate and distinguish between a location on one of the information storage medium and on another storage medium other than the storage medium, and
buffer information for the interactive file to be reproduced and which the apparatus uses to distinguish whether the interactive file to is be buffered in one of the allocated portion of the buffer and another portion of the buffer not allocated for the updateable interactive file.

22. The information storage medium of claim 13, wherein:
the first data includes an image, and
the apparatus interprets the interactive file to display the image from the first data in a first portion of a display, and to display the interactive file as an interactive display in a second portion of the display other than the first portion.

23. The information storage medium of claim 22, wherein the first data includes audio data used by the apparatus to be reproduced through an audio output as the image is reproduced in the interactive mode.

24. The information storage medium of claim 22, wherein the first data includes a video comprising the image.

25. The information storage medium of claim 13, wherein the first data includes audio data to be reproduced through an audio output as the interactive file is reproduced.

* * * * *

UNITED STATES PATENT AND TRADEMARK OFFICE
CERTIFICATE OF CORRECTION

PATENT NO.       : 7,627,230 B2                                      Page 1 of 1
APPLICATION NO. : 10/812010
DATED            : December 1, 2009
INVENTOR(S)      : Chung et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1619 days.

Signed and Sealed this

Second Day of November, 2010

David J. Kappos
*Director of the United States Patent and Trademark Office*